United States Patent [19]

Harats et al.

[11] Patent Number: 5,318,861
[45] Date of Patent: Jun. 7, 1994

[54] ELECTROCHEMICAL METAL-AIR CELL AND ELECTRICALLY AND MECHANICALLY RECHARGEABLE ANODES FOR USE THEREIN

[75] Inventors: Yehuda Harats; Jonathan R. Goldstein, both of Jerusalem, Israel

[73] Assignee: Electric Fuel Limited, Jerusalem, Israel

[21] Appl. No.: 2,656

[22] Filed: Jan. 11, 1993

[30] Foreign Application Priority Data

Jan. 10, 1992 [IL] Israel ..................................... 100625

[51] Int. Cl.$^5$ ............................................. H01M 8/18
[52] U.S. Cl. ....................................... 429/21; 429/27; 429/22; 429/41; 429/44; 429/59; 429/142; 429/246; 429/233
[58] Field of Search ....................... 429/21, 27, 41, 44, 429/22, 136, 142, 246, 233, 59

[56] References Cited

U.S. PATENT DOCUMENTS

| | | | |
|---|---|---|---|
| 3,532,548 | 10/1970 | Stachurski | 429/21 |
| 3,619,297 | 11/1971 | Moran | 136/86 A |
| 3,630,785 | 12/1971 | Whitestone et al. | 429/136 |

FOREIGN PATENT DOCUMENTS

| | | | |
|---|---|---|---|
| 2085867 | 12/1971 | France . | |
| 0000843 | 1/1978 | Japan | 429/136 |
| 1212482 | 11/1970 | United Kingdom . | |
| 1382025 | 1/1975 | United Kingdom . | |

OTHER PUBLICATIONS

J. Postula et al. "On the Use of Third Electrodes in a Secondary Zinc-Air Battery", 1969, p. 45, Energy Conversion.

Postula et al., Use of third electrodes in a Secondary Zinc-air battery; Energy Conters; 1970; Chem Ab. 72468p; p. 435.

Skalozubov et al.; Accelerated magnetometric electrical signal testing method for iron electrodes of alkaline batteries; 1969; Chem. Ab.: 72470h; p. 435.

*Primary Examiner*—Kathryn Gorgos
*Attorney, Agent, or Firm*—Helfgott & Karas

[57] ABSTRACT

An electrochemical metal-air cell for multiple discharge and recharge cycles, includes a housing for accommodating a replaceable metal electrode having a generally planar electrically conductive skeletal member encompassed by an active metal component. At least one generally planar, air permeable but liquid impermeable air electrode is installed at at-least one of the sides of the housing. An electrolyte is provided in contact with the metal and the air electrodes. One or more auxiliary electrodes each constituting a charging anode is engaged when electric current is applied thereto for effecting the reduction and regeneration of the active metal component in one mode of operation, during which the air electrode is disengaged. The charging anode is disengaged in another mode of operation. The metal electrode is removed from the housing to enable the mechanical replacement thereof and is recharged in situ when electric current is applied to the auxiliary charging anode to reduce oxidized active metal thereof.

22 Claims, 11 Drawing Sheets

ELECTROCHEMICAL METAL-AIR CELL AND ELECTRICALLY AND MECHANICALLY RECHARGEABLE ANODES FOR USE THEREIN

FIELD OF INVENTION

The present invention relates to an electrochemical metal-air cell and to replaceable, rechargeable anodes for use therein. More particularly the present invention relates to such cells for use in metal-air batteries specifically designed for automotive application.

BACKGROUND OF THE INVENTION

Due to their high energy-to-weight ratio, safety of use, and other advantages, metal-air, and particularly zinc-air, batteries have been proposed as a preferred energy source for use in electrically powered vehicles.

To date, much of the development concerning use of metal-air batteries as a main power source for vehicle propulsion has focused on modified "mechanically rechargeable" primary battery systems comprising a consumable metal anode and a nonconsumable air cathode. The metal anode is configured to be replaceable once the metal component therein is expended following oxidation in the current producing reaction. These systems obviously constituted an advance over the previously proposed secondary battery systems which have to be electrically charged for an extended period of time once exhausted, and require an external source of direct current.

Some of these mechanically rechargeable systems, such as the one disclosed in U.S. Pat. No. 4,139,679 to Appelby are quite complex in construction, incorporating an active particulate metal anode component freely suspended in an alkaline electrolyte, and a pump to keep the particulate metal anode in suspension and circulated between air cathodes. After discharge of the metal anode component, the electrolyte is then replaced with an electrolyte containing a fresh particulate metal anode component in suspension.

Other prior art battery systems, such as the one disclosed in U.S. Pat. No. 3,436,270 to Oswin, comprise electrochemical cells utilizing a fixed planar anode configured for easy replacement and placed in close adjacency to one or more air cathodes, physically separated therefrom but kept in current producing contact with the cathode by an alkaline electrolyte. Referring to FIG 1., in such prior art devices, a metal anode element denoted 10 generally comprises a central corrosion resistant current collector planar metallic mesh or foil frame 12 attached to a base member 14, and a terminal 16. An anode 18 consisting of a laminated sheet metal or porous metal plate or a viscous slurry of active metallic particles, typically zinc, impregnated with electrolyte is spread over frame 12. Once the metal anode element 10 is entirely discharged, it is removed from the cell and replaced by a fresh anode element. These systems have been particularly heralded for use in electric vehicle propulsion since they facilitate quick recharging of the vehicle batteries simply by replacement of the spent anodes, while keeping the air cathodes and other battery structures in place. This mechanical recharging, or refueling may be accomplished for instance in service stations dedicated to the purpose. To further enhance the cost efficiency of such systems, it has been proposed in our above copending application to regenerate the metal anode at an external plant by chemical recycling process so that it may be reformed into a fresh anode element for later reuse in either the same or a different cell.

Despite the obvious advantages of such a primary mechanically rechargeable system, it appears desirable to offer the electric vehicle owner a further option of occasionally electrically recharging a normally mechanically rechargeable primary battery, since electrical recharging may offer: (i) a potentially lower marginal cost per recharging, (ii) where the owner has sufficiently available time, increased convenience since the need to go to a battery refueling/service station is reduced, and (iii) reduced overall impact on battery refueling/service station infrastructure requirements. Such electrical recharging would be as applicable with respect to secondary batteries, that is by reversing the direction of current flow by applying direct current to the cells.

However, converting mechanically rechargeable primary cells into electrically rechargeable secondary cells is considerably more difficult than merely reversing the direction of current flow by applying current to the cell to recharge the spent electrodes.

As known in the art, one of the principal advantages of the metal-air secondary battery lies in the fact that only the metal anode requires recharge. The air cathode, since it relies on electrochemical reduction of ambient oxygen by a static catalyst for the comsumption of electrons in the current producing reaction, need not be regenerated.

Studies have shown that attempts to adapt prior art metal-air cells comprising a structured metal anode for electric regeneration as secondary cells have met with three principal problems: (1) uneven replating of the metal anode following the electric recharge process, particularly slumping of the metal anode element to the bottom portions of the anode as illustrated in FIG. 2; (2) formation of dendrites generally perpendicular to the recharging cathode which eventually short out the cell by bridging between the metal anode and air electrode; and (3) degradation of the air electrode arising from production of oxygen in the recharging process causing oxidation and corrosion of the electrode, and delamination of its components, as well as a build up of internal pressure within the cell tending to force electrolyte into contact with the outside environment resulting in contamination and evaporation.

As a result of a combination of the above problems, proposed fixed anode metal-air batteries suffer from a reduction of efficiency following electrical recharging, requiring additional complex and expensive adaptive means to retard the negative effects of recharging. In the absence of such adaptations, the entire cell or battery must be replaced following only a very limited number of recharge cycles. Moreover, even the longest life rechargeable metal-air batteries are subject to severe degradation of the metal anode following repeated electrical discharge/recharge cycles. Such degradation eventually leads to irreversible damage of the anode thus requiring that the entire cell or battery be replaced. Replacement may be required even though other battery structures including the housing, cathodes and current collectors may still be perfectly usable, which of course is wasteful.

In our copending U.S. application No. 07/636,411 filed on Dec. 31, 1990 it has been proposed to electrochemically regenerate spent metal anode active material external to the battery. However, even when severe but less than irreversible degradation is caused by the above described processes of repeated inplace electrical discharge/recharge, it has been found that the external regeneration is made more lengthy, difficult and costly. In extreme instances, external regeneration may be even rendered impossible.

Prior art, U.S. Pat. No. 3,650,837 and U.S. Pat. No. 3,759,748 both to Palmer, teaches attempts to solve the problem of air electrode degradation by providing improved air electrodes incorporating improved catalysts and composite construction to reduce destruction upon recharging. U.S. Pat. No. 4,957,826 to Cheiky, teaches means to prevent electrolyte leakage and contamination. U.S. Pat. No. 4,842,963 to Ross offers a particular solution to the problem of dendrite formation in a fixed non-replaceable anode of an electrically rechargeable metal-air cell. However, the prior art fails to teach a comprehensive solution to the above problems, particularly preventing the complete and irreversible exhaustion of the metal anode or otherwise providing for adaptation of primary mechanically rechargeable metal-air batteries to be repeatedly electrically recharged.

OBJECTS AND SUMMARY OF THE INVENTION

Thus, it is the principal object of the invention to provide an essentially mechanically rechargeable metal-air primary battery system, however capable of being repeatedly electrically recharged.

It is a further object of the invention to provide a comprehensive solution to the above mentioned problems of adapting fixed anode metal-air mechanically rechargeable primary cells to be electrically recharged.

It is still a further object of the invention to provide means for ensuring that the anode be mechanically replaced to allow for its external regeneration prior to the anode suffering damage following substantial degradation upon multiple discharge/recharge cycles.

Broadly, the electrochemical metal-air cell of the present invention is adapted for repeated discharge and recharge cycles. The cell comprises a frame housing defining an interior space for containing therein a replaceable metal electrode. The electrode comprises a planar electrically conductive skeletal member embracing an active metal component. The cell further incorporates at least one generally planar air permeable but liquid impermeable air electrode installed at-least one of the sides of the housing, and an electrolyte in contact respectively with the metal and air electrodes. To effect recharging of the cell, the metal electrode has been adapted to be either easily replaced (mechanical recharging) or recharged by application of electric current thereto. A mechanical spacer, in the form of an electrolyte permeable formed woven or non-woven insulating material to prevent shorting is generally interposed between the metal anode and air electrode cathode elements.

The active metal component of the metal electrode may comprise porous or a sintered metal sheet, an electrolyte impregnated slurry of metal particles or solid sheet; however, due to their electrogenerative capacity a porous sheet or slurry is generally preferred. However, as a result of the particulate composition, such anodes are particularly prone to slumping upon electrical recharge (FIG. 2).

More specifically according to the present invention, there is now provided an electrochemical metal-air cell, adapted for multiple discharge and recharge cycles, comprising a housing defining an interior space for containing therein a replaceable metal electrode having a generally planar electrically conductive skeletal member encompassed by an active metal component; at least one generally planar air permeable but liquid impermeable air electrode installed at at-least one of the sides of the housing; an electrolyte in contact with the metal and the air electrodes; and further comprising one or more auxiliary electrodes, each auxiliary electrode constituting a charging anode adapted to be engaged upon application of electric current thereto for effecting the reduction and regeneration of said active metal component in a first mode of operation, during which said air electrode is disengaged, and to be disengaged in a second mode of operation, wherein said metal electrode is configured for removal from said interior space to enable the mechanical replacement thereof as well as being rechargeable in situ by the application of electric current to said auxiliary charging anode to reduce oxidized active metal thereof.

The invention also provides a replaceable, rechargeable anode for use in an electrochemical metal-air cell as defined above. The anode comprises a generally planar electrically conductive skeletal member embracing an active component, in combination with at least one auxiliary charging electrode; said anode and said auxiliary charging electrode being bounded and enveloped by at least one removable separator and being removable together therewith from said cell.

In one embodiment of the invention, the metal electrode is constructed of an electrically conductive skeletal cellular support structure containing a plurality of open ended volumes, each volume packed with a slurry of metal particles chosen from metals having a high oxygen affinity, such as zinc, impregnated with an electrolyte to create a static anode bed. Due to the structure of the cellular frame, slumping of the metal anode slurry is constricted to within each of the respective volumes, while in general remaining distributed over the entire frame. The cellular structure may be in the form of a ladder, honeycomb, woven mesh, expanded metal, perforated plate and the like extending over the full anode thickness, or only a portion thereof.

Moreover, as is known, the severity of dendrite growth generally increases proportionately to the geometric area of the anode. Thus, it is a further advantage of the cellular structure that the active metal anode is subdivided into a plurality of smaller geometric areas thereby reducing dendrite formation and associated degradation of the anode as a whole.

In another embodiment, the skeletal frame comprises a plurality of rigid rods or wires supporting and encompassed by compacted active zinc slurry formed of porous zinc granules.

Other means to inhibit dendrite formation in the anode regeneration process comprise an ion selective membrane, the membrane being permeable to hydroxyl ions, but impermeable to electrolyte-soluble complex ions of the metal comprising the metal anode. For example, where the anode element is comprised of zinc, the electrolyte-soluble complex ion that can form or discharge would be zincate ions ($Zn(OH)_4^{--}$). Ideally, the membrane will be configured to envelop the metal electrode as part of a removeable metal electrode cassette; it may also be configured to cover the air electrode or function as a stand-alone separator. When configured to envelop the metal anode, the complex ion by-product of the current producing electrochemical reaction is inhibited from migrating beyond the membrane, thus establishing a barrier to dendrite growth.

Advanced degradation of the metal anode is further prevented by periodic mechanical replacement thereof, or of the active anodic material, the battery and component cells being specifically designed to facilitate easy mechanical recharging.

One means of overcoming cathode degeneration is by use of a bi-functional air electrode comprising a durable catalyst having low over-voltage characteristics for oxygen evolution upon recharging, the catalyst being capable of withstanding oxygen formation.

Thus, in another embodiment of the present invention there is provided an electrochemical metal-air cell, adapted for multiple discharge and recharge cycles, comprising a housing defining an interior space for containing therein a replaceable metal electrode having a generally planar electrically conductive skeletal member encompassed by an active metal component; at least one generally planar air permeable but liquid impermeable air electrode installed at at-least one of the sides of the housing; an electrolyte in contact with the metal and the air electrodes, wherein said air electrode is a bi-functional electrode, adapted to constitute a charging electrode adapted upon reversal of current flow to effect the reduction and regeneration of the active metal component of said replaceable metal electrode in a first mode of operation, and wherein the metal electrode is removed from the interior space to enable the mechanical replacement thereof and is recharged in situ by the application of electric current to said bi-functional air electrode to reduce oxidized active metal thereof.

In another alternative embodiment allowing for the use of higher efficiency but charge-sensitive air electrodes, one or more catalyzed auxiliary charging electrodes adapted to engage only upon application of a charging current to the cell, and to be at all other times disengaged, are interposed into the cell.

The auxiliary charging electrodes may be permanently positioned within the cell. Alternatively, the charging electrodes may be included as part of the said metal electrode cassette, adapted to be fully interchangeable with cassettes not having charging electrodes, thus providing a means for selecting between more flexible electrical/mechanical rechargability and less costly but higher performance solely mechanical rechargability.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENT

Figure 3:
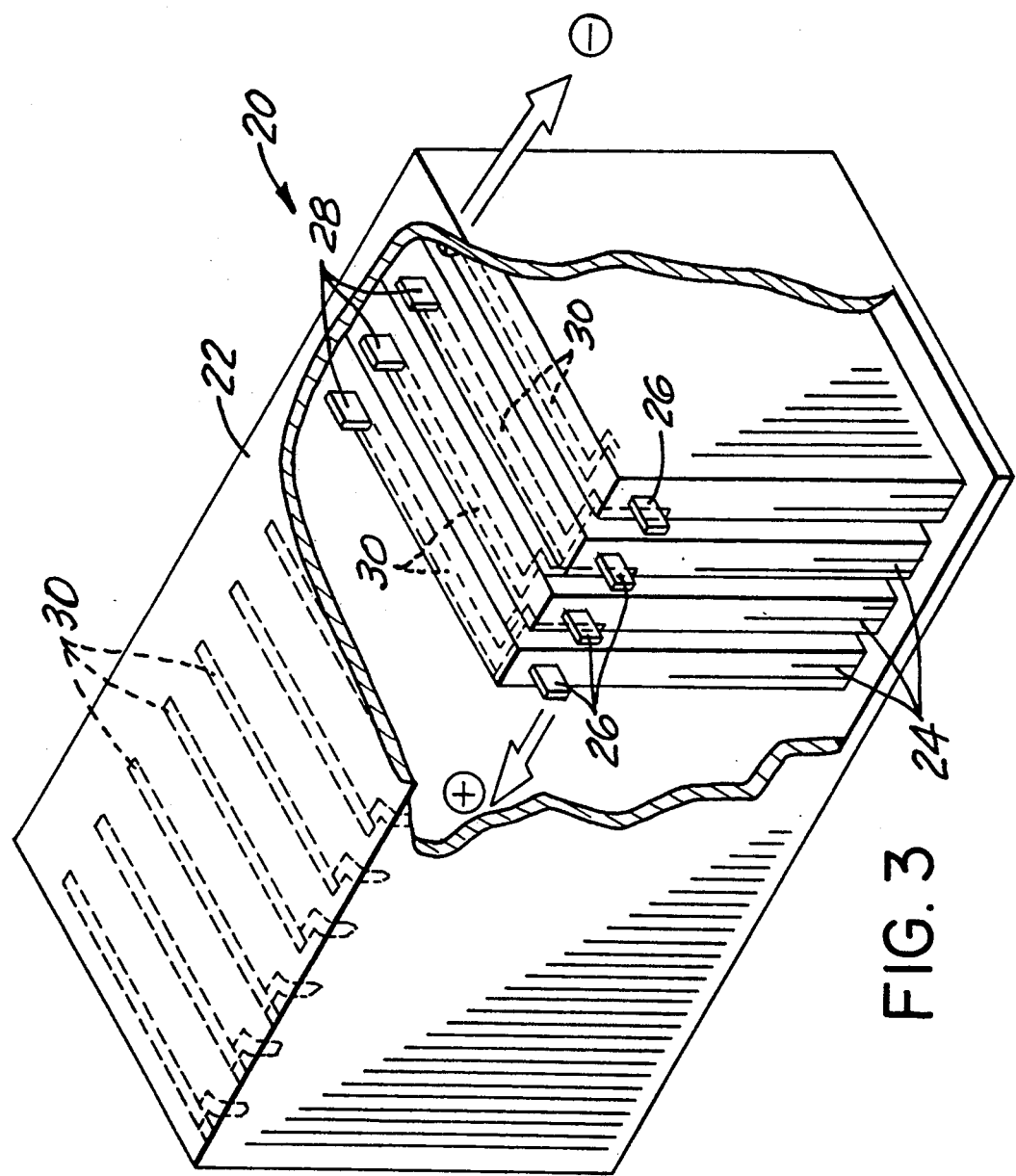
FIG. 3 is a perspective view of a battery in operational configuration, partially cut away, comprising a plurality of metal-air cells according to the invention.

Briefly referring to FIG. 3, there is shown a battery generally denoted 20 comprising a casing 22 and a multitude of serially connected electric cells 24, details of which will be given below.

Each of the cells has positive and negative electric contact terminals 26 and 28 respectively, the cells being interconnected in series by way of electrically conductive bus bars shown in broken lines and denoted 30.

Figures 4, 5:
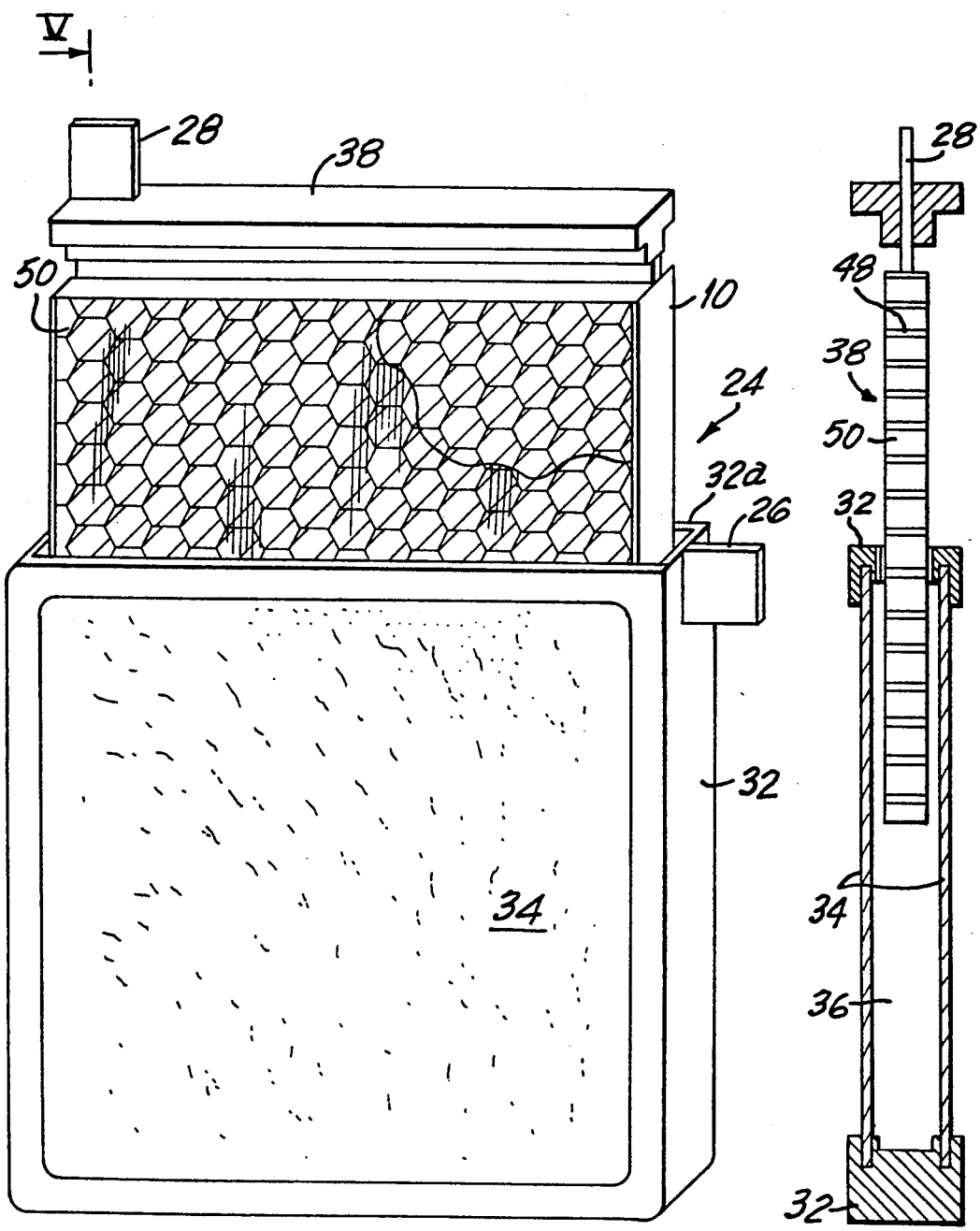
FIG. 4 is an elevation of the metal-air cell according to a particular embodiment of the present invention, with the anode cassette partially removed and separator screen cut away.
FIG. 5 is a cross section taken along line V—V of FIG. 4.

A typical cell 24 of mono-polar construction is depicted in FIGS. 4 and 5. Each cell comprises a nonconductive frame housing 32, suitably formed of polypropylene. A pair of outer air electrodes 34 are installed into the frame housing 32 to form an interior space 36 constructed to receive a mating metal electrode cassette 38, and an electrolyte (not shown). The frame housing 32 and electrode cassette 38 are configured and constructed to facilitate easy removal and insertion of cassette 38 into space 36; while, at the same time, providing a fully sealed electrolyte tight cell when the cassette is inserted and fully seated. Electrical make and break means (not shown) between the contact terminals 28 and bus bars 30 are further provided to establish a battery circuit between a group of cells.

Any suitable alkaline electrolyte may be used, KOH though being found particularly suitable. The air electrodes 34 are substantially gas permeable but liquid impermeable so as to prevent leakage of the electrolyte and facilitate electrolyte contact with the metal electrode. While a cell of mono-polar construction is illustrated, it should be clearly understood that the cell may be of bipolar construction i.e., only one outer air electrode 34 per anode cassette 38.

Construction of the air electrodes 34 and the metal electrode cassette 38 will now be described in greater detail with reference to FIG. 6. As illustrated, air electrodes 34 are of basically conventional design comprising at each side thereof, inner and outer frame members 40 and 42 respectively, a conductive current collector 44 and a metallic mesh 46. The frame members 40 and 42 are of mating construction and fabricated from nonconductive plastics, such as polypropylene. The metallic mesh basically consists of a thin, perforated nickel screen, typically 0.2 mm thick and having 20 holes/cm, laminated on the outer side with a hydrophobic blocking layer, suitably Teflonized carbon, permeable to air but impermeable to water based electrolyte. The inner side of the mesh 46 is laminated with a composite having a high affinity for oxygen and capacity for reducing oxygen to hydroxyl ions. Composites of platinum, silver, mixed metal oxides and macrocyclics, with or without carbon have been found particularly suitable. Various known in the art catalysts and composite constructions may be used depending on the desired effects.

The metal electrode cassette 38 comprises the central anode element 10 enveloped by a pair of removable separators 50. Separators 50, provided at each side of the anode element 10 are constructed of inner and outer frame members 52 and 54, respectively, a protective mesh or non-woven screen 56 and an optional selectively permeable ion selective membrane 58. Frame members 52 and 54 are of mating construction and are fabricated from nonconductive material, typically polypropylene or other suitable plastic. While it is generally preferable that the separators 50 attach to and envelop anode element 10, forming anode cassette 38, clearly they may also be attached to air electrodes 34 or set in free-standing disposition between the anode element 10 and air electrodes 34 in interior space 36 (FIG. 5). Protective screen 56 are typically fabricated from woven or non-woven NYLON®, a long chain synthetic polymeric amide, or polypropylene and adapted to establish a barrier preventing physical contact between the anode element 10 and air electrodes 34 which would result in shorting out the cell. Moreover, screen 56 serves to protect the air electrodes 34 and the ion membrane 58 from damage upon removal or insertion of the cassette 38 from the housing 32.

The ion selective membrane 58 typically comprises a hydrophilic film formed of irradiated inert polyethylene, polypropylene or TEFLON®, polytetrafluoroethylene, base film, permeable to hydroxyl ions but impermeable to complex ions formed in the current producing chemical reaction occurring between the anode element 10 and the air electrodes 34. Suitable membranes for use in a zinc based cell would be from the family of battery separators sold by RAI Research Corporation under the tradename PERMION®.

Figure 7:
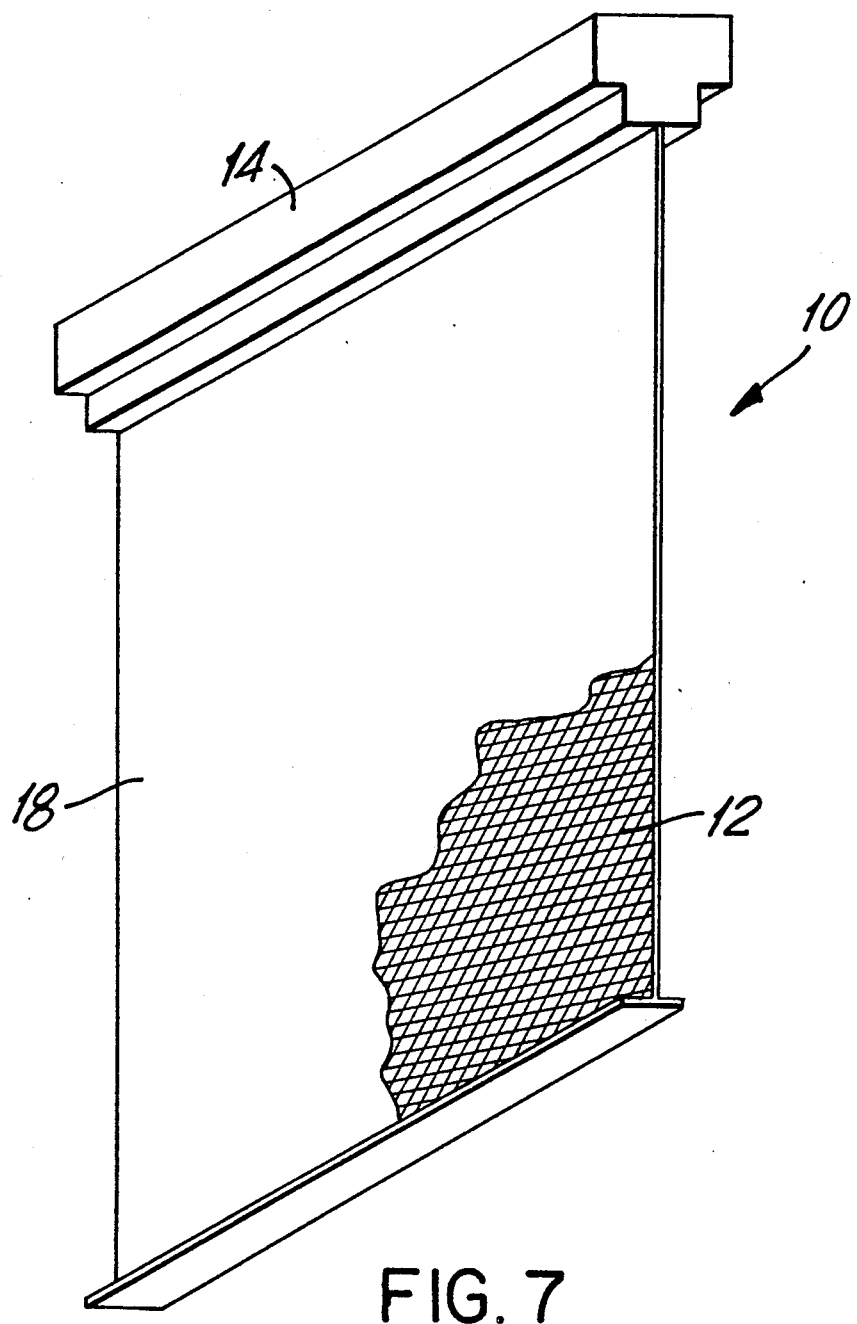
FIG. 7 is a perspective view of the metal anode illustrated in FIG. 1.

According to one particular embodiment of the invention depicted in FIG. 7, a known in the art metal anode element 10 comprising a conductive skeletal frame, denoted 12, and a base member 14 is used. Skeletal frame 12 is typically constructed from a perforated screen or mesh of copper, steel or nickel, optionally coated with lead, tin, cadmium or their alloys. Moreover, highly efficient and closely fitted ion membranes 58 as described above are advantageous to constrain dendrite formation.

To function as a metal anode element, skeletal frame 12 must be coated with porous or non porous anode material 18 of high oxygen affinity metal, typically zinc, in order to achieve efficient repeated rechargings.

In general, a porous metal anode sheet is advantageous compared to a non-porous sheet, in order to increase the interface surface with electrolyte and in general to enhance current producing reaction process. A porous sheet may be fabricated by any known in the art process, for example pasting; alternatively viscous slurry, comprising fine metal particles impregnated with electrolyte may be evenly spread over the skeletal frame 12 to form the anode sheet 18.

Figure 8:
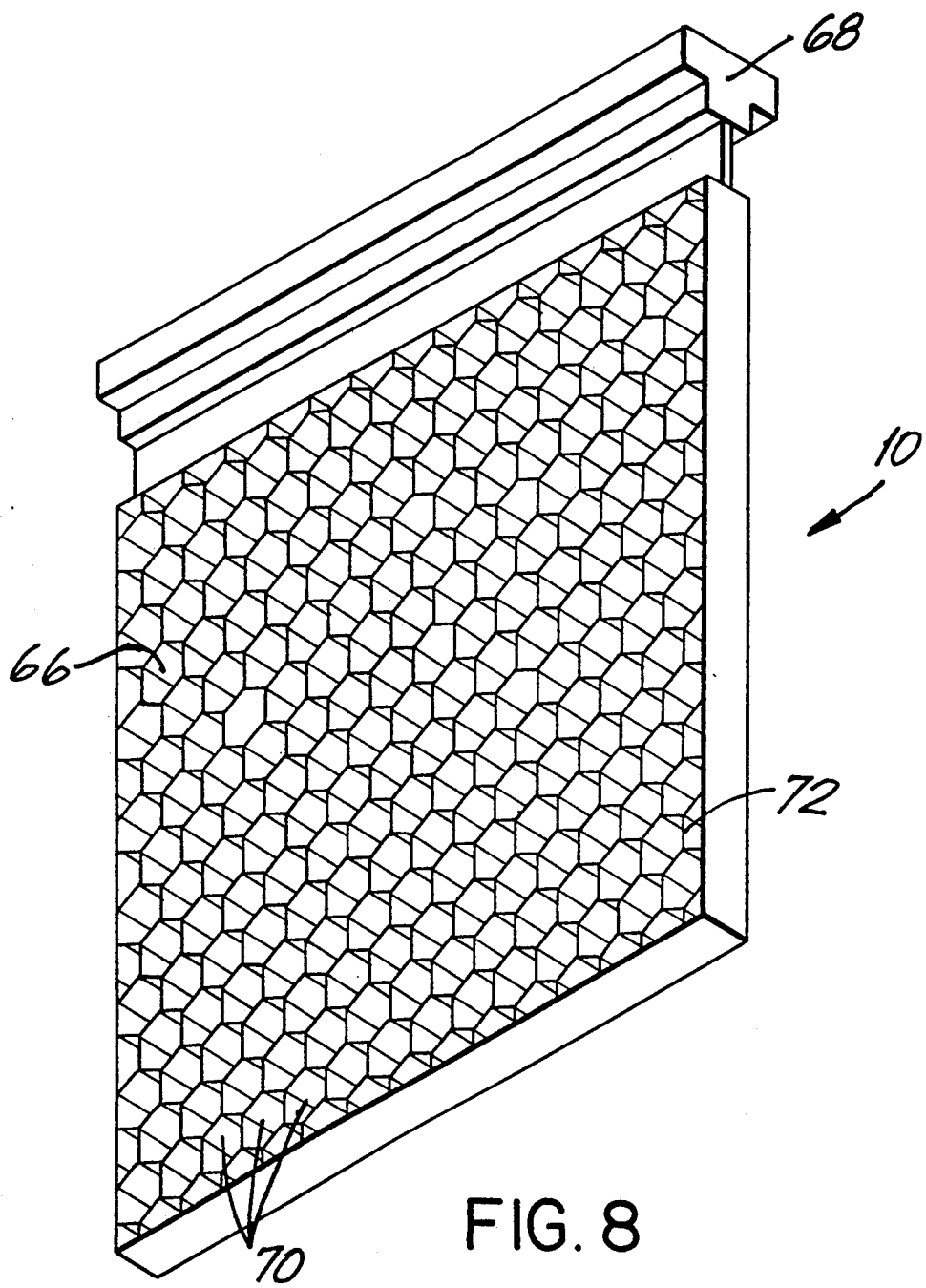
FIG. 8 is a perspective view of a metal electrode according to a particular embodiment of the invention.

In an alternative embodiment of the invention illustrated in FIG. 8, metal anode element 10 is comprised of an electrically conductive 3-dimensional skeletal frame 66, and base member 68. Base member 68 is configured to fit into the upper end 32a of frame housing 32 and form a liquid tight seal. Typically the frame is fabricated from copper, steel or nickel, optionally plated with lead, tin or cadmium, and having a cellular like structure formed by adjoining open ended polygonal shaped volumes 70.

Each of the volumes is packed with a viscous slurry of active metal particles impregnated with electrolyte thus creating a structured static anode bed 72 evenly distributed over the entire frame 66. The skeletal frame 66 may be sufficiently thick so that the entire slurry fits within the volumes; alternatively a thinner frame 66 may be used so that some of the slurry fits into the volumes while the remainder is evenly spread over the face of the frame 66. Any metal with a high affinity for oxygen may be used, however from the standpoint of cost, weight-output ratio and rechargeability, zinc is preferred. The viscosity and composition of the slurry may be varied to achieve different output and life span characteristics.

Figure 1:
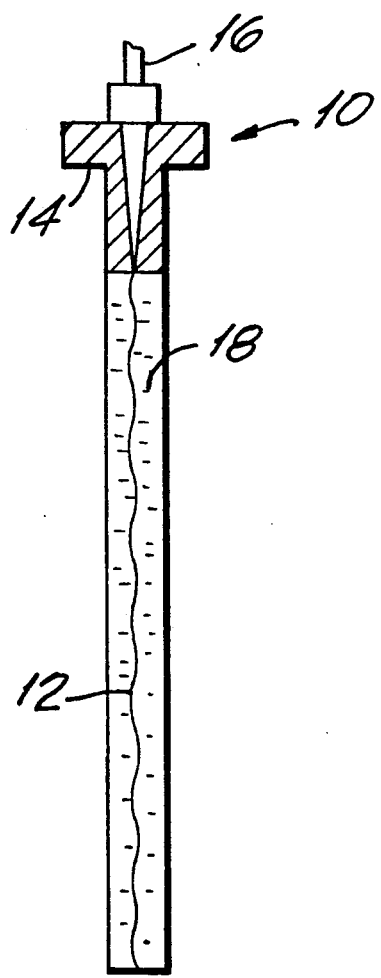
FIG. 1 is a cross sectional view of a metal electrode according to the prior art usable in the context of a mechanically rechargeable primary metal-air cell.
Figure 2:
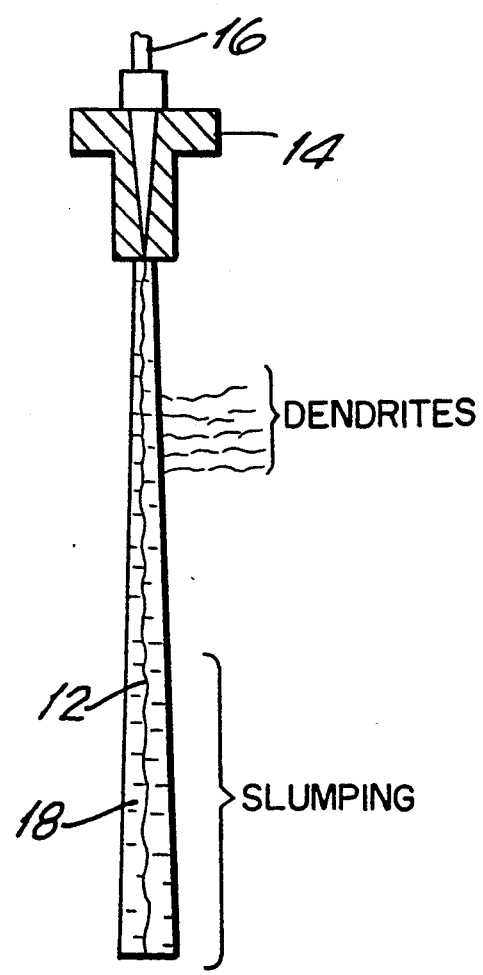
FIG. 2 shows the electrode of FIG. 1 illustrating the problems of slumping and dendrite formation after only a few cycles of secondary recharging.
Figure 9A:
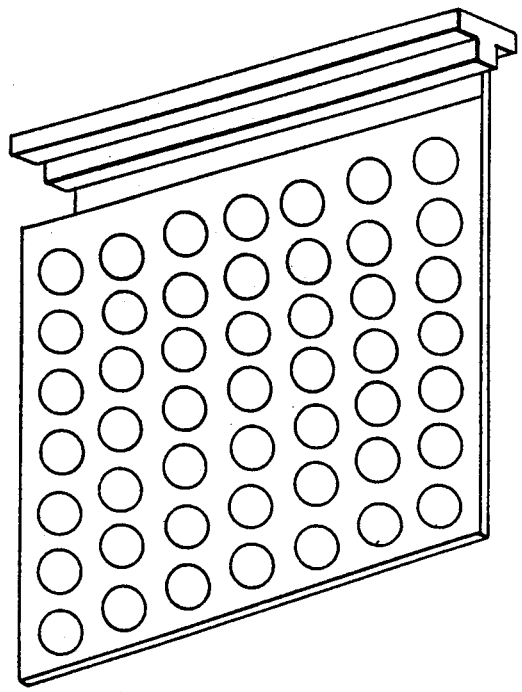
FIGS. 9a–9c illustrate some alternative metal electrodes incorporating different shapes of anode supports.
Figure 9B:
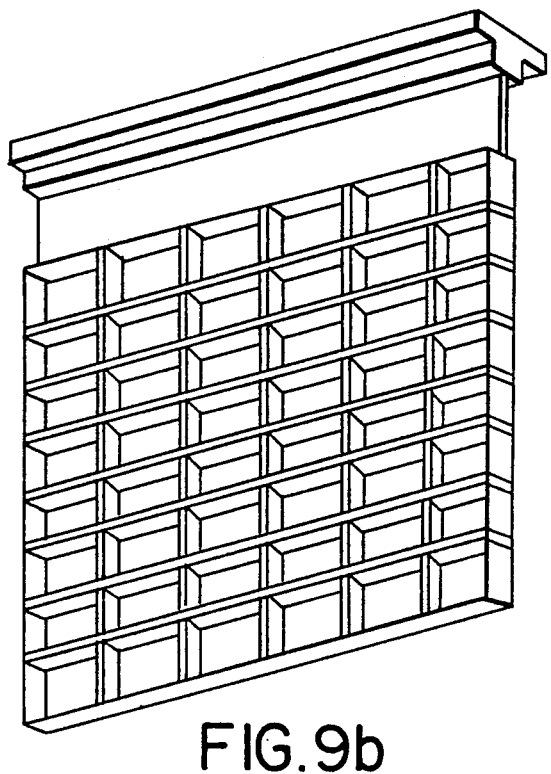
Figure 9C:
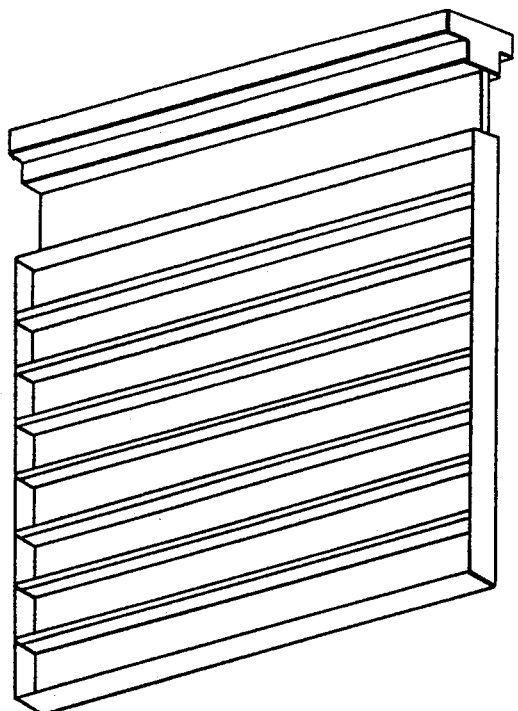

The cellular configuration of the frame 66, whether of full or partial width, provides a structure minimizing both slumping of the anode bed 72 upon recharging as well as formation of dendrites tending to bridge between the metal anode element 10 and the air electrode 34 as discussed above. Instead of the mass of the anode bed 72 slumping to the bottom of the metal anode 10, as shown in FIG. 2, slumping of the anode bed 72 occurs within the confines of each volume 70, such that the anode bed 72 remains generally distributed over the entire face of frame 66, as illustrated in FIG. 9 (see below).

Figure 10:
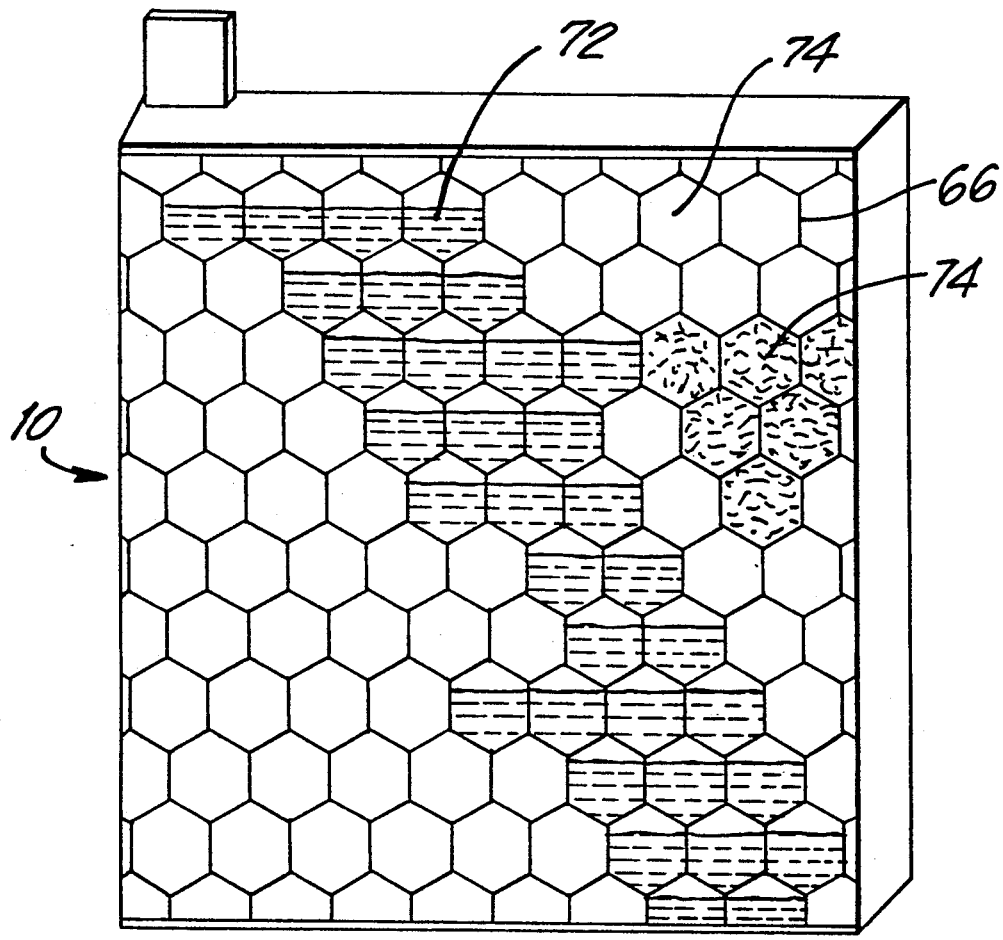
FIG. 10 is a frontal view of the anode of FIG. 8, illustrating the effects of slumping and dendrite formation following repeated recharging.

Due to the cellular structure, the geometric plane on which dendrite growth can occur is subdivided, thereby on the one-hand, reducing dendrite growth as a whole. Moreover, the dendrite growth that does occur tends to remain confined within the cells as illustrated in FIG. 10 rather than extend perpendicularly in the direction of the air electrode.

Figure 6:
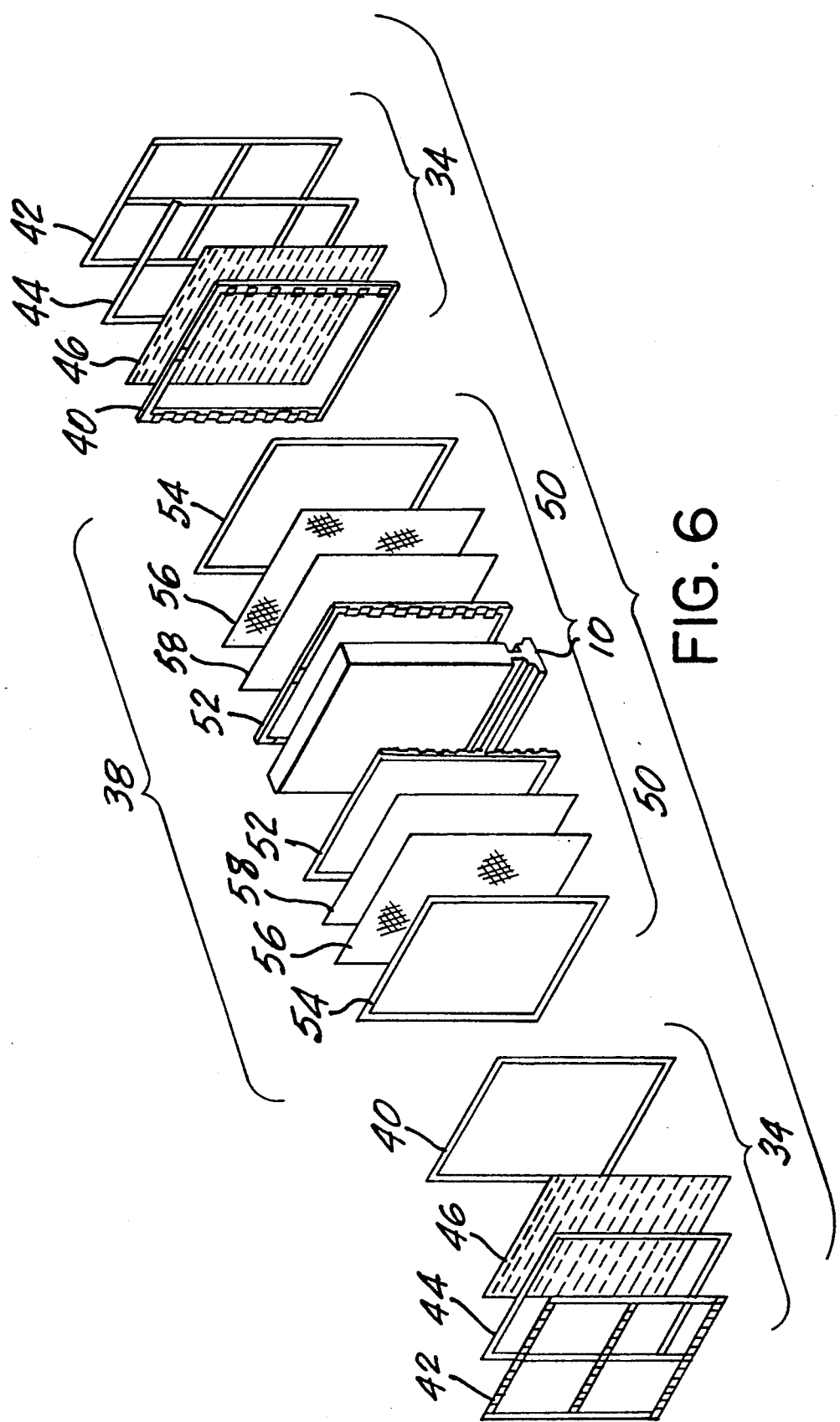
FIG. 6 is an exploded view showing the components of the metal-air cell in FIG. 4.

According to a further aspect of the present invention, the cell 24 is provided with a bi-functional air electrode 34 generally of the description given above with reference to FIG. 6, however, incorporating a highly oxidation and corrosion resistant composite catalyst, typically formed of a mixture of transition metal oxides. Such bi-functional air electrodes are known in the art with respect to solely electrically rechargeable battery cells, and therefore need not be further described.

Figure 11:
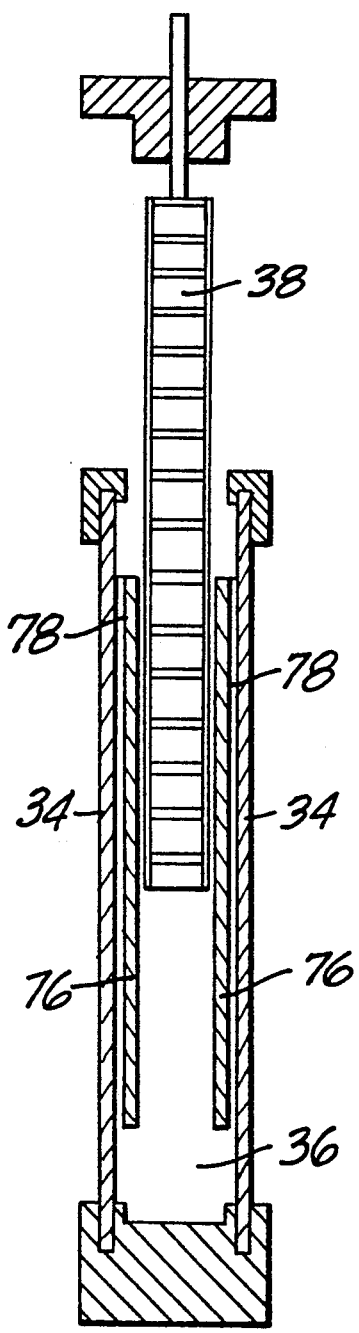
FIG. 11 is a cross section of a mechanically and electrically rechargeable metal-air cell according to one embodiment of the present invention comprising a single metal anode and two auxiliary charging electrodes.
Figure 12:
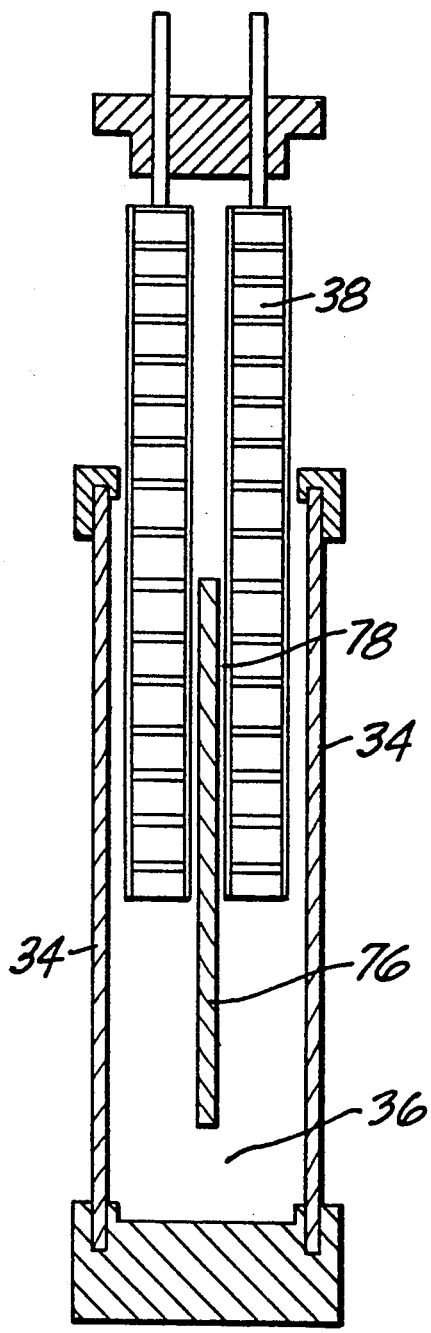
FIG. 12 is a cross section of a mechanically and electrically rechargeable metal-air cell according to another embodiment, comprising two metal anodes and a centrally displaced auxiliary recharging electrode.

In further embodiments, illustrated in FIGS. 11 and 12, a cell of generally the same configuration and construction as that described with reference to FIGS. 4 and 5 is provided, however, with the addition of an auxiliary charging anode or anodes, denoted 76. The charging electrode is comprised of a metal element such as a nickel screen being 0.2 mm thick and having 20 holes per cm, covered with a catalyst having a low over-voltage for oxygen evolution to encourage in the recharge cycle enhanced oxygen generation at a low voltage. A suitable catalyst may be comprised of mixed oxides of cobalt and nickel, deposited onto the screen by any commonly known processes. The auxiliary electrode is typically wrapped in a protective envelope 78, consisting of woven or non-woven Nylon ® or polypropylene, and an optional selective ion membrane as described above. Use of such an auxiliary charging electrode facilitates the use of higher efficiency—higher power, less expensive, but charge-sensitive cathodes as compared with the bi-functional electrodes described above.

Typically, each of the cells is provided with a direction sensitive relay circuit (not shown) so that upon reversal of polarity and application of a charging current, the auxiliary charging electrode 76 becomes engaged, while at the same time disengaging the air electrode 34, resulting in application of current to the charging electrode 70 only.

A cell 24 comprising auxiliary charging electrodes 76 may be constructed either as a single anode cell (FIG. 11) comprising two auxiliary charging electrodes 76 fixedly interposed between anode cassette 38 and air electrodes 34, or as a bi-anode cell (FIG. 12) comprising two adjoining anode cassettes and an auxiliary electrode 76 fixedly interposed therebetween in the cell as illustrated.

Figure 13:
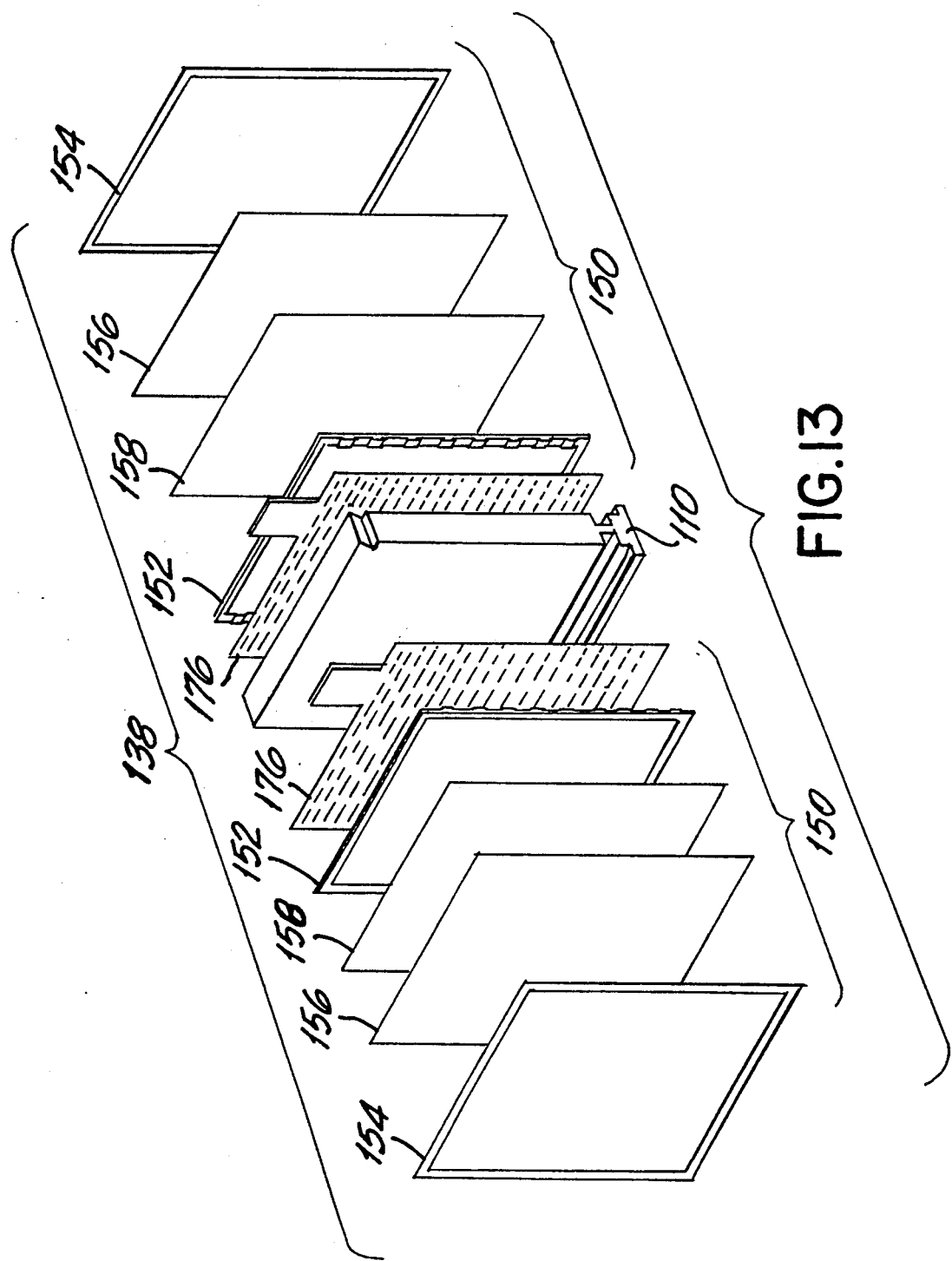
FIG. 13 is an exploded view of a hybrid metal electrode cassette comprising a metal anode and auxiliary charging electrode configured as a removable cassette.

Referring now to FIG. 13, there is shown a hybrid metal electrode cassette 138 having substantially the same dimensions and components as the metal electrode cassette 38 illustrated in FIG. 6, with the exception of the addition of a pair of auxiliary charging electrodes 176. Thus, the hybrid cassette comprises a central anode element 110 enveloped by a pair of separators 150, the separators being constructed of inner and outer frame members 152 and 154 protective mesh 156 and an optional selectively permeable ion selective membrane 158, the auxiliary charging electrode 176 being interposed between separators 150 and the central anode element 110 as shown. Such a hybrid cassette 138 is configured to be interchangeable with cassette 38. Thus, by selection of the desired cassette, regular or hybrid, the user may readily convert the cell to be electrically/mechanically rechargeable, or alternatively solely mechanically rechargeable as desired; it being understood that the choice is left to the user on the basis of cost versus performance and relative flexibility concerning available recharging options.

It has been found that chemical recycling of the metal anode bed 72 following replacement of the metal anode cassette is best and most cost effectively accomplished prior to the anode having undergone many repeated cycles of electric recharging. Thus, counter circuitry (not shown) may be provided to ensure that the cell cannot be recharged more than a pre-set number of times prior to mechanical replacement of the anode cassette 38.

Figure 14:
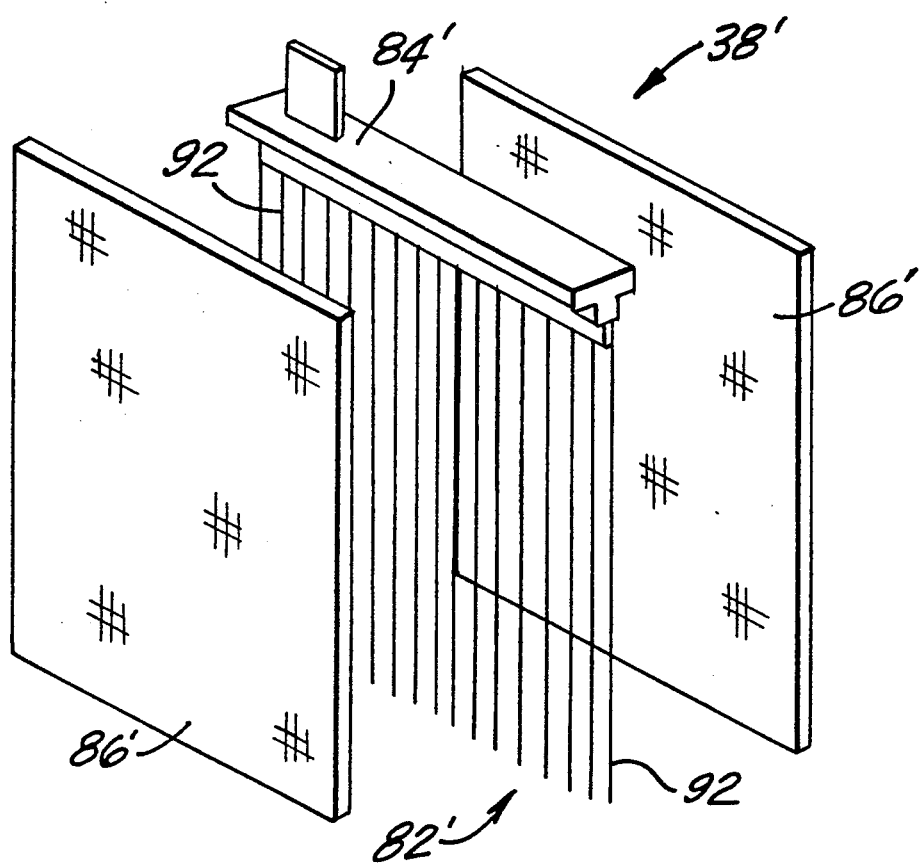
FIG. 14 is an exploded view of another embodiment of the anode of the present invention.

Alternatively, as illustrated in FIG. 14, the skeletal frame 82' may be comprised of a series of rigid rods or wires 92 projecting from the base member 84' as illustrated. The rods or wires 92 may be suitably constructed of any of the conductive metals mentioned above. As a weight saving feature, the rods 92 alternatively may be formed of inert plastics, suitably polypropylene, Nylon ® or polyvinylchloride, optionally all or some of which are coated with the said conductive metals. A combination of metal and plastic rods may be incorporated as well.

The active anode element 86 (or 86') is formed from a slurry of porous zinc granules impregnated with and suspended in any suitable electrolyte. The slurry is cold-compacted under pressure at room temperature until adherence of the granules into a rigid static bed of active anode material is achieved. Whereafter said rods or wires 92 are encompassed by the compacted active zinc slurry 86' formed of porous zinc granules to form a regular electrode cassette 38'.

Slurry prepared from porous granules comprising zinc, impregnated with and suspended in an electrolyte comprising an aqueous solution of a hydroxide of a group Ia metal, and optionally including inorganic corrosion inhibitors (e.g. PbO CdO ZnO HgO $In_2O_3$, SnO or a combination thereof), organic corrosion inhibitors (e.g. phosphate esters or tetramethyl ammonium hydroxide), gelling agents (e.g. carboxymethyl cellulose), electrolyte extenders (e.g. sodium silicate), fillers (e.g. graphite) and labelling agents (e.g. cresol, red), produced according to the teachings of applicant's copending European Patent application has been found to be particularly suitable.

From the foregoing description, it should be clear that the present invention provides a solution to the particular problem of adapting mechanically rechargeable metal-air cells, normally rechargeable by replacement of the anode or anodic active material, to be repeatedly recharged as secondary cells by application of electric current. This paves the way for the introduction of such mechanically rechargeable batteries as a main power source for vehicle propulsion in the mass market. It should be appreciated by any person skilled in the art that a large variety of variations may be introduced to the invention herein described, for example construction of the cells as bi-polar cells having one air electrode per metal electrode, without departing from its scope as defined in and by the appended claims.

It will, thus, be evident to those skilled in the art that the invention is not limited to the details of the foregoing illustrative embodiments, and that the present invention may be embodied in other specific forms without departing from the essential attributes thereof, and it is, therefore, desired that the present embodiments be considered in all respects as illustrative and not restrictive, reference being made to the appended claims, rather than to the foregoing description, and all changes which come within the meaning and range of equivalency of the claims are, therefore, intended to be embraced therein.

What is claimed is:

1. An electrochemical metal-air cell, for multiple discharge and recharge cycles, comprising:
   (a) a housing having a base, two major surfaces and two minor surfaces defining an interior space for containing therein a replaceable metal electrode having a generally planar electrically conductive skeletal member encompassed by an active metal component, said interior space communicating with an opening opposite said base through which said replaceable metal electrode is selectively removed to enable the mechanical replacement thereof with a freshly charged metal electrode;

(b) at least one generally planar air permeable but liquid impermeable air electrode, each of said at least one air electrode installed in a window opening provided in at least one of said major surfaces;

(c) an electrolyte in contract with the metal and air electrodes; and further comprising (d) one or more auxiliary electrodes positioned in a spaced-apart relationship with and adjacent to said replaceable metal electrode;

each auxiliary electrode constituting a charging anode which upon application of electrical current thereto is engaged via said electrolyte in a charging circuit with said metal electrode for effecting electrical recharging of said metal electrode by the reduction and regeneration of said active metal component of said metal electrode in an electrical charging mode of operation, during which said air electrode is disengaged with said metal electrode forming an open circuit between said air electrode and said metal electrode;

and each of said auxiliary electrodes is disengaged from said metal electrode while said air electrode is engaged therewith in a discharging mode of operation, whereby said metal electrode is periodically, selectively removed from said interior space via said opening to enable the mechanical replacement thereof and is periodically, selectively electrically recharged in situ by the application of electric current to said auxiliary charging anode to reduce oxidized active metal of said metal electrode.

2. The cell as claimed in claim 1 wherein the active metal component comprises porous zinc particles.

3. The cell as claimed in claim 2 wherein the metal particles are formed into a slurry impregnated with an electrolyte.

4. The cell as claimed in claim 3 wherein the skeletal member comprises a plurality of open ended volumes for holding the slurry.

5. The cell as claimed in claim 4 wherein said skeletal member comprises a plurality of rigid rods or wires supporting and encompassed by compacted active zinc slurry formed of porous zinc granules.

6. The cell as claimed in claim 4 wherein said skeletal member comprises a perforated plate for holding the slurry.

7. The cell as claimed in claim 1, further comprising a mechanical electrolyte permeable spacer positioned between adjacent electrodes.

8. The cell as claimed in claim 7 wherein the mechanical spacer is of woven a long-chain synthetic polymeric amide, polypropylene or plastic mesh.

9. The cell as claimed in claim 7 wherein the mechanical spacer is of non-woven a long-chain synthetic polymeric amide, or polypropylene fabric.

10. The cell as claimed in claim 9, further comprising an ion selective membrane surrounding each of said one or more auxiliary electrodes.

11. The cell as claimed in claim 10 wherein the ion selective membrane is permeable to hydroxyl ions, but impermeable to electrolyte soluble complex ions of the metals comprising the metal anode.

12. The cell as claimed in claim 11 wherein said electrolyte permeable spacer and said ion selective membrane are interposed between the metal electrode and the air electrode so as to physically separate the metal electrode from the air electrode and confine electrolyte soluble complex ions of the metals comprising the metal component to the vicinity of the metal electrode.

13. The cell as claimed in claim 12 wherein said electrolyte permeable spacer and said ion selective membrane, where present, are attached to and cover the air electrode.

14. The cell as claimed in claim 12 wherein said spacer and optional ion selective membrane are attached to and cover the metal electrode thereby forming a removeable cassette.

15. The cell as claimed in claim 14 wherein said metal electrode cassette comprises at least one auxiliary charging electrode.

16. The cell as claimed in claim 11 wherein each auxiliary electrode is fixedly positioned within the housing.

17. The cell as claimed in claim 1 comprising a pair of metal electrodes and a single auxiliary electrode wherein the auxiliary electrode is positioned between the said pair.

18. The cell as claimed in claim 1 comprising a single metal electrode and pair of auxiliary electrodes, wherein each member of the auxiliary electrode pair is positioned between the metal electrode and a corresponding air electrode.

19. The cell as claimed in claim 1 further comprising overcharge warning and prevention means to warn against and prevent electrical recharging a number of times greater than a predetermined maximum.

20. The cell as claimed in claim 1 electrically interconnected with at least one other similar cell to form a battery.

21. A replaceable, rechargeable anode for use in an electrochemical metal/air cell according to claim 1, said anode comprising a generally planar electrically conductive skeletal member embracing an active component, in combination with at least one auxiliary charging electrode, wherein said anode and said auxiliary charging electrode are bounded and enveloped by at least one removable separator and are removed together therewith from said cell.

22. An electrochemical metal-air cell for multiple discharge and recharge cycles, comprising:

(a) a housing having a base, two major surfaces and two minor surfaces defining an interior space for containing therein a replaceable metal electrode having a generally planar electrically conductive skeletal member encompassed by an active metal component, said interior space communicating with an opening opposite said base through which said replaceable metal electrode is selectively removed to enable the mechanical replacement thereof with a freshly charged metal electrode;

(b) at least one generally planar air permeable but liquid impermeable air electrode, each of said at least one air electrode installed in a window opening provided in at least one of said major surfaces;

(c) an electrolyte in contact with the metal and air electrodes, wherein said air electrode is a bi-functional electrode capable of accepting a charge upon reversal of current flow in said cell and application of electric current to said electrode and effects via said electrolyte the reduction and regeneration of the active metal component of said replaceable metal electrode in a first mode of operation, and wherein the metal electrode is periodically, selectively removed from the interior space to enable the mechanical replacement thereof and is recharged in situ by the application of electric current to said bi-functional air electrode to reduce oxidized active metal of said metal electrode.

* * * * *